Nov. 16, 1948.   M. S. JOHNSON   2,454,064
PIPE ANCHOR

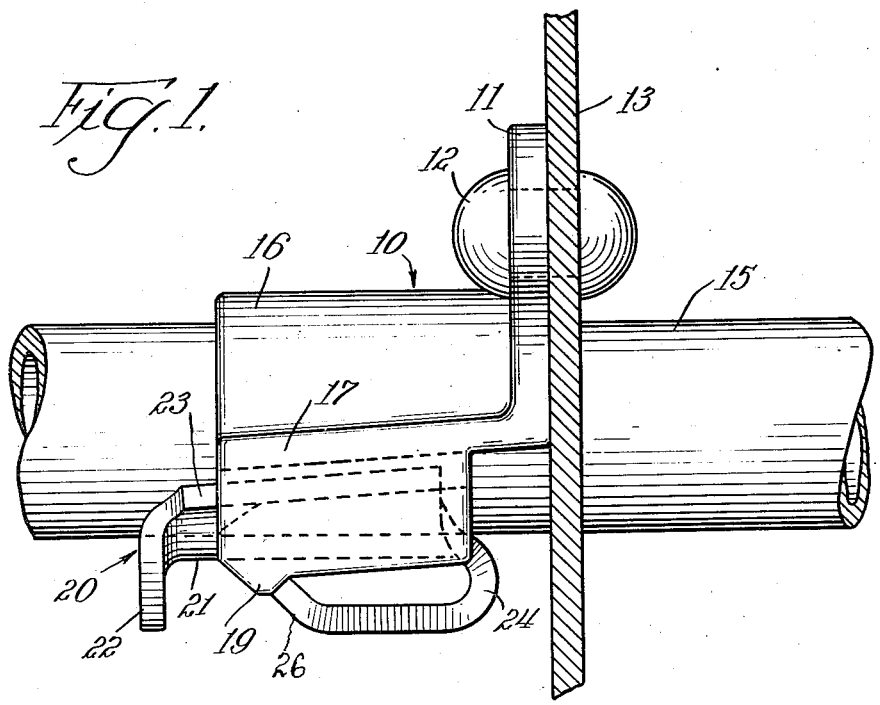
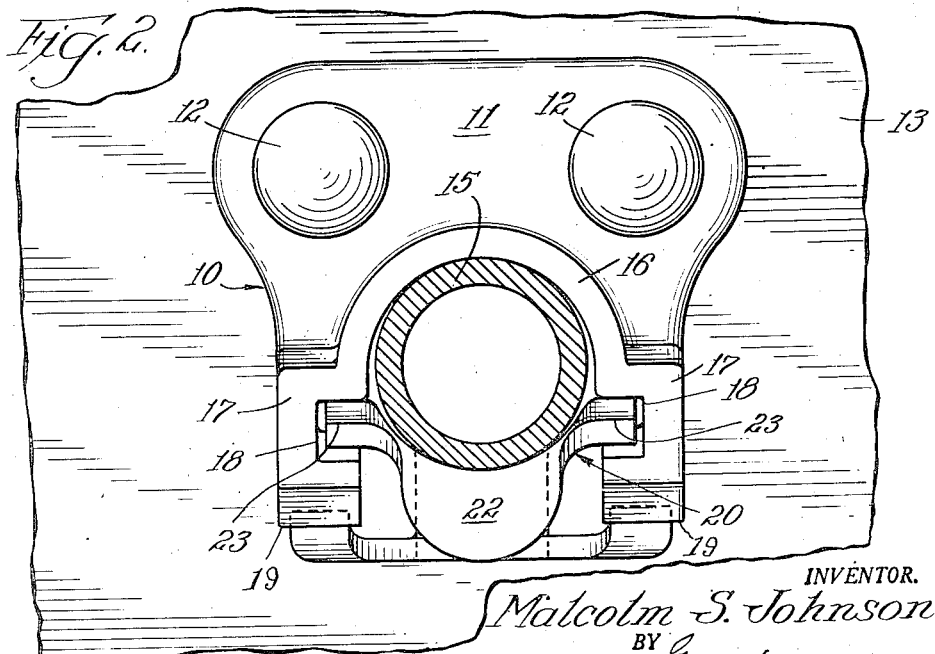

Filed Nov. 29, 1945   2 Sheets-Sheet 2

INVENTOR.
Malcolm S. Johnson
BY
Atty.

Patented Nov. 16, 1948

2,454,064

UNITED STATES PATENT OFFICE 2,454,064

PIPE ANCHOR

Malcolm S. Johnson, Chicago, Ill., assignor to Illinois Railway Equipment Company, Chicago, Ill., a corporation of Illinois Application November 29, 1945, Serial No. 631,629

9 Claims. (Cl. 248—56)

1

My invention relates to an anchor for firmly and at the same time removably clamping the air lines or pipes of the air brake systems of railroad cars so as to rigidly hold the same against movement and the excessive vibrations to which they are subjected, in order to avoid ruptures in the pipe connections and resultant air line leaks which interfere with proper air brake system operation.

The invention contemplates a pipe anchor whose main body portion may be intimately secured to a sill of the car underframe and become an integral or permanent part thereof, while at the same time permitting the pipe or air line to be easily renewed, should occasion require, without necessitating dismantling or removal of the body portion of the anchor.

The invention, more specifically stated, contemplates an anchor wherein the respective elements when placed in pipe clamping position will effect a self-locking relation without need for additional holding means, such as bolts and the like; the elements cooperating with each other to maintain the desired and initial clamping relation with the pipe regardless of any attempt at longitudinal or lateral movement or vibration of the pipe. The invention comprises a pipe receiving main body element and a wedge element which, when driven into proper pipe clamping position, will automatically effect such interlocking engagement with the main body member that its accidental disengagement or movement out of pipe clamping position is impossible.

A further object of the invention is the provision of an anchor which provides a long, full and non-fracturing bearing for both sides of the pipe and whereby pipe shifting forces will be transmitted through the main body element to the car underframe; the anchor being adaptable to variations in pipe size which eliminates the necessity for pre-assembly; the anchor being of a construction which may be readily placed in clamping condition without need of special skill or tools.

The operation and advantages of my improved anchor will all be readily comprehended from the detailed description of the accompanying drawings wherein—

Figure 1 is a side elevation of my improved anchor attached to a sill member, shown in cross-section, of a car underframe and a section of pipe clamped in place.

Figure 2 is an end elevation as viewed from the left in Figure 1.

2

Figure 4:
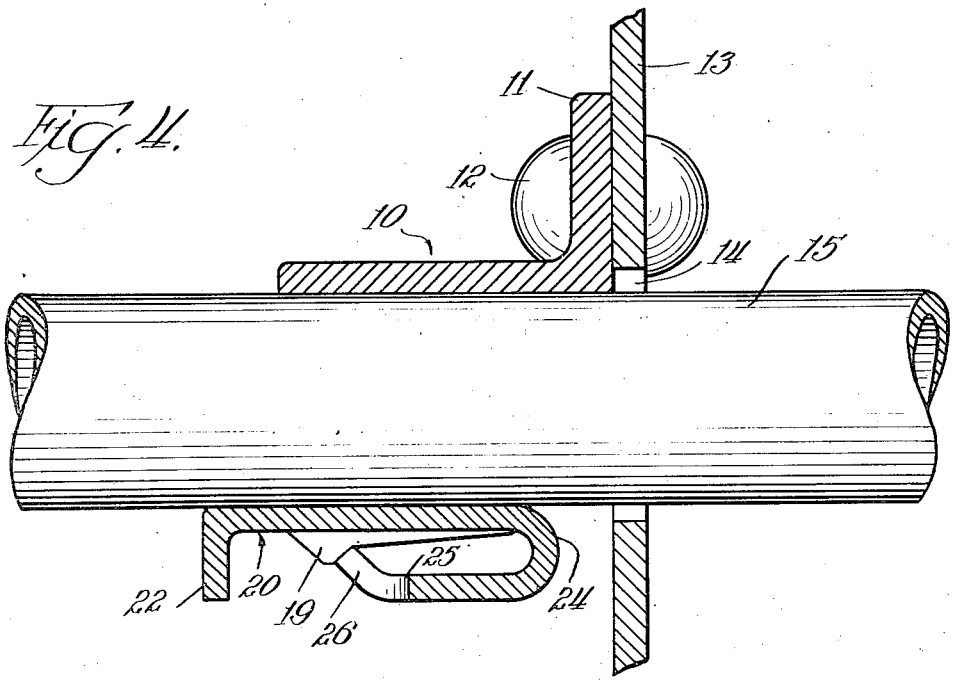

Figure 4 is a vertical sectional view, taken along the longitudinal median line of the anchor, with the section of pipe in elevation.

The particular exemplification of the invention comprises a main body or base member 10, provided with an angularly disposed flange 11 which is apertured to permit the body member to be riveted as at 12, or otherwise rigidly secured to one of the metallic sills or members 13 of the car underframe, so as to become a rigid immovable part of the sill, adjacent an opening therethrough—as at 14 in Figure 4—through which the air line or pipe 15 extends.

The body member 10 is provided with a substantially semi-cylindrical pipe receiving portion 16 and two spaced apart, substantially vertical or parallel sides 17, 17 of sufficient thickness to be provided with opposingly facing grooves 18, 18 extending lengthwisely of the side walls 17, 17, which preferably terminate in a vertical plane outward of the plane of the attaching flange 11, as more clearly seen in Figure 1.

The grooves 18, 18 preferably become somewhat narrower toward the rear or flange-end of the member 10, while the outer forward ends of these grooves preferably are slightly flared to readily guide the wedge or clamp member during initial insertion. The lower surface, preferably of both side walls 17, 17, and adjacent the outer forward end of the body member, is vertically enlarged to provide the downwardly presented or perpendicular teeth or lugs 19, 19. The opposite ends of the lugs 19, 19 preferably are provided with sloping surfaces as more clearly shown in Figures 1 and 4 for reasons hereinafter set forth.

The body member 10, when subsequently applied to the car, is seated on the air line or pipe 15 and rigidly secured, as by rivets, to the sill member through which the pipe extends, after which a pipe wedge member 20 is lengthwisely slid into place in contact with the lower side of the air line or pipe 15.

The member 20 consists of a lengthwisely dished pipe engaging body or portion 21, with the dishing or channel preferably decreasing or made slightly narrower and shallower at the forward outer end where the wedge member 20 preferably is formed with a depending lip 22 whereby the edge member may be driven into complete wedging position. The arcuate pipe receiving portion 21 at opposite edges terminates in substantially straight marginal portions 23, 23 which are adapted to slide in the grooves 18, 18 of the body member 10; the lower walls of the grooves preferably sloping slightly upward toward the rear end of the body member, thus, in conjunction with the gradual increasing shallowness of the arcuate or dished pipe receiving portion of the wedge member, effecting a binding or wedging relation with the pipe circumferentially about the pipe.

Figure 3:
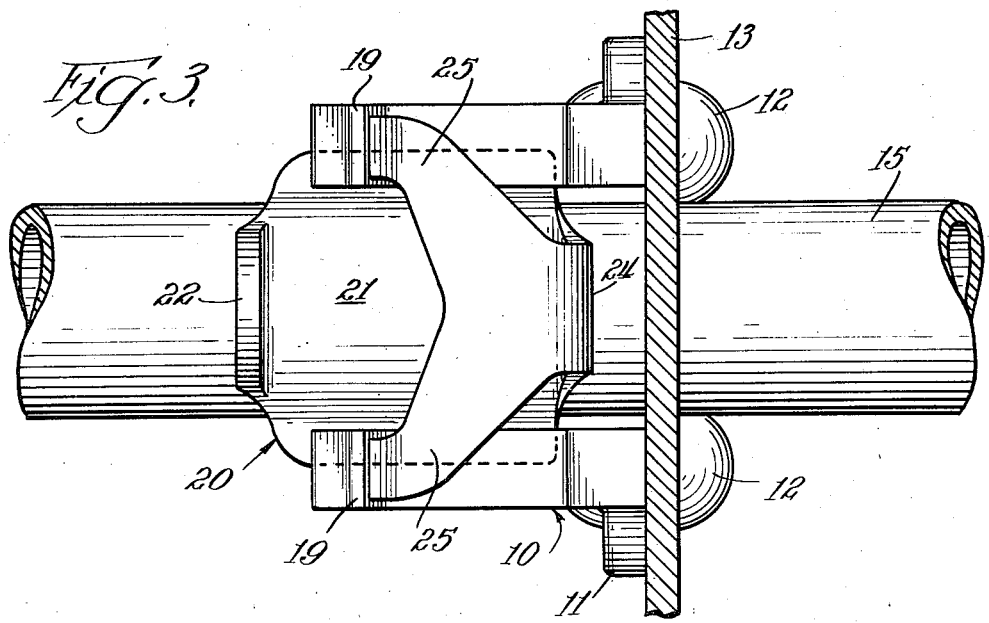
Figure 3 is a bottom plan view.

The inner or rear end of the arcuate portion 21 of the wedge member terminates in a relatively narrow downwardly and forwardly curved tail or loop portion 24 which terminates in diverging bifurcations or flared arms 25, 25, see Figure 3, each of which terminates in an upwardly curved or sloping finger or end 26 having a flat outer and slightly sloping end surface which matches and abuts against the inner or rearward sloping face of the adjacent tooth or lug 19, formed on the lower surface of the respective depending side walls and adjacent the front end of the main body member 10, as clearly shown in Figures 1 and 4 after the wedge member has been completely driven into pipe clamping position. The teeth or lugs form stops which make accidental dislodgement or release of the wedge member 20 impossible.

The wedge member 20 preferably is made of steel with sufficient rigidity at the pipe and main body engaging portion to resist deformity, while the narrow tail or loop portion 24 will sufficiently flex under hammer blows to permit the fingers or ends 26 to be forced over the sloping outer faces of the lugs 19, 19 and snap into firm holding engagement with the rear faces of the lugs; the wedge member preferably being made of sufficiently thick spring steel which will merely flex sufficiently under the influence of a hammer blow on the outer depending lip 22 and by reason of its resiliency in the bowed narrow loop portion will snap back to normal position after passing over the crowns or tips of the lugs 19, 19 and thereby firmly lock the wedge member 20 in pipe clamping position.

In order to remove the wedge member 20 when occasion requires, a suitable rod or bar is inserted between the bottom of the main member 10 and the bifurcated tail portion and the latter flexed sufficiently to enable the ends 26, 26 to become disengaged from and to pass over the lugs 19, 19.

As is apparent from the foregoing description and the drawings, my improved pipe anchor merely involves two members or elements; with the wedge member having self-contained locking means which automatically engages vertically off-set surfaces on the main body member, so that the use of separate bolts or other elements for maintaining the wedging member in pipe clamping position is eliminated.

While it is customary to fasten the anchoring means to the vertical side of a car sill, it will be understood that the fastening flange 11 may be shaped to conform with the car underframe construction; the construction described and shown in the drawings being thought to be the best embodiment of my invention, but structural modifications are possible without, however, departing from the spirit of my invention as defined in the appended claims.

What I claim is:

1. A pipe anchor comprising a main body member adapted to be immovably secured in place, having a pipe receiving channel and parallel spaced sides provided with oppositely facing grooves while the lower faces of the sides are provided with off-set surfaces; and a wedge member having a pipe engaging surface with side portions adapted to enter the grooves of the body member and provided on its outer side with off-set laterally disposed extensions adapted to effect interengaging relation with the off-set surfaces of the body member and prevent movement of the wedge member.

2. A pipe anchor comprising a main body member adapted to be immovably secured in place, having a pipe receiving surface and spaced side walls whose inner faces are provided with laterally offset surfaces and the lower face of the body member provided with a perpendicular off-set surface; and a wedge member adapted to engage the opposite side of the pipe while its lateral edges are formed to cooperate with said laterally off-set side wall surfaces and thereby effect clamping relation with the pipe, said wedge member having a reversely bent extension adapted to effect interengaging relation with said perpendicular off-set surface and thereby lock the wedge member against movement.

3. A pipe anchor comprising a main body member adapted to be immovably secured in place, having a pipe receiving channel and spaced side walls with laterally off-set surfaces inclining upwardly toward the rear, the body of the member on its exterior having a vertically off-set surface; and a wedge member adapted to engage the pipe while its side edges are formed to cooperate with said laterally off-set surfaces whereby the wedge member is forced into pipe clamping condition, said wedge member having a resilient extension adapted to snap into locking engagement with said body off-set surface.

4. A pipe anchor of the character described comprising a main body member adapted to be immovably secured in place, having a pipe receiving channel and spaced side walls with laterally off-set surfaces, the bottom of the member having perpendicular off-set surfaces; and a wedge member adapted to engage the pipe while its side edges are formed to cooperate with said laterally off-set surfaces and thereby force the wedge member into pipe clamping condition, said wedge member at its outer side having a pair of fingers adapted to snap into locking engagement with said perpendicular off-set surfaces and thereby lock the wedge member against movement.

5. A pipe anchor of the character described comprising a main body member adapted to be immovably secured in place, having a pipe receiving channel and perpendicular spaced side walls with grooves on their inner sides, the bottoms of the side walls having perpendicular off-set surfaces; and a wedge member having a pipe engaging surface and side edges adapted to slide in said grooves and in conjunction therewith be forced into pipe clamping condition, the rear end of the wedge member having a downwardly and forwardly bent extension adapted to snap into locking engagement with said perpendicular off-set surfaces and thereby lock the wedge member against movement.

6. A pipe anchor comprising a main body member adapted to be immovably secured in place, having a pipe receiving channel and spaced perpendicular side walls with laterally off-set surfaces on their inner sides, while the bottoms of said walls have perpendicular off-set surfaces; and a wedge member with a pipe engaging surface and side edges adapted to effect interengaging relation with said laterally off-set surfaces and provide pipe clamping condition, the rear end of the wedge member having a resilient downwardly and forwardly bent extension terminating in fingers adapted to snap into holding engagement with said perpendicular off-set surfaces and thereby lock the wedge member in pipe clamping position.

7. A pipe anchor comprising a main body member adapted to be immovably secured in place, having a pipe receiving channel and spaced perpendicular side walls with grooves on their inner faces, while the bottoms of said side walls have perpendicular off-set surfaces; and a wedge member with a pipe engaging surface and side edges adapted to slide in said grooves and provide pipe clamping condition, the lower side of the wedge member having a pair of resilient fingers adapted to spring into holding engagement with said perpendicular off-set surfaces and thereby lock the wedge member in pipe clamping position.

8. A pipe anchor comprising a main body member adapted to be immovably secured in place and having a pipe receiving channel between two spaced perpendicular side walls provided on their inner faces with grooves inclining towards the rear of the body member, while the bottoms of the side walls are provided with perpendicularly off-set surfaces; and a wedge member with a pipe engaging surface and side edges adapted to slide in said grooves and provide pipe clamping condition, said wedge member having laterally disposed resilient upwardly curving fingers adapted to snap into locking engagement with said off-set surfaces whereby the wedge member is held in pipe wedging position.

9. A two piece pipe anchor of the character described comprising a main body member adapted to be immovably secured in place, having a pipe receiving channel and spaced perpendicular side walls with grooves on their inner faces from end to end substantially parallel with said channel while the bottoms of said walls are provided with lugs having forward sloping sides; and a wedge member with a pipe engaging surface and side edges adapted to slide in said grooves and provide pipe clamping condition, the forward end of the member being bent into a depending driving lip, while the rear end is formed with a resilient downwardly and forwardly bent extension flaring forwardly into a pair of upwardly sloping straight edged fingers adapted to ride over the forward sloping sides of said lugs and snap into abutting relation with the rear sides of the lugs and thereby lock the wedge member in pipe wedging position.

MALCOLM S. JOHNSON.

No references cited.